United States Patent

Sonnet

[11] 4,015,896
[45] Apr. 5, 1977

[54] REFLECTING-LENS OBJECTIVE

[75] Inventor: Günther Sonnet, Bad Kreuznach, Germany

[73] Assignee: Jos. Schneider & Co., Bad Kreuznach, Germany

[22] Filed: July 9, 1975

[21] Appl. No.: 594,230

[30] Foreign Application Priority Data

July 10, 1974  Germany .......................... 2433062

[52] U.S. Cl. .................................................. 350/201
[51] Int. Cl.² ........................................ G02B 17/08
[58] Field of Search ............................ 350/201, 27

[56] References Cited

UNITED STATES PATENTS 2,141,884  12/1938  Sonnefeld .......................... 350/201

FOREIGN PATENTS OR APPLICATIONS 1,358,795  3/1964  France .............................. 350/201

Primary Examiner—John K. Corbin
Assistant Examiner—Conrad Clark
Attorney, Agent, or Firm—Karl F. Ross; Herbert Dubno

[57] ABSTRACT

An objective particularly designed for copying machines consists of a biconvex lens air-spaced from a negative-meniscus lens with silvered convex surface, known as a Mangin mirror.

1 Claim, 1 Drawing Figure

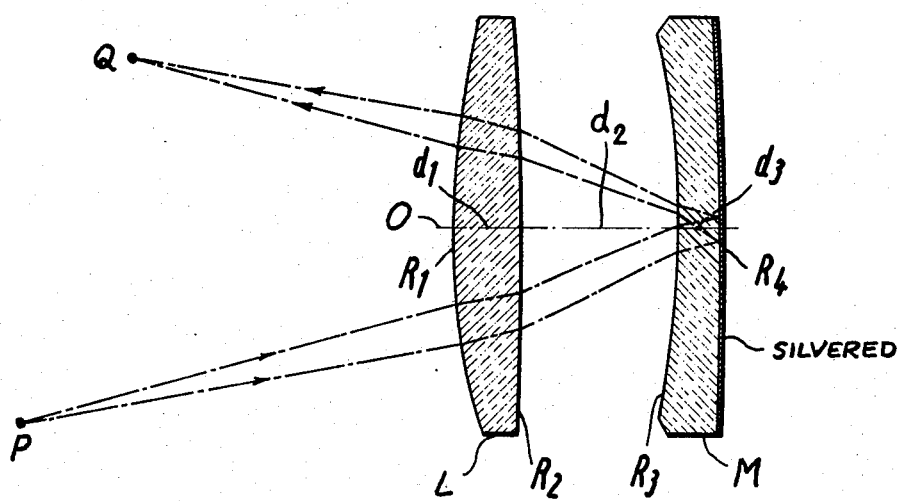

REFLECTING-LENS OBJECTIVE

The present invention relates to an optical objective of the reflecting-lens type wherein a positive first component, in the form of an ordinary lens, and a negative second component, designed as a thick mirror with a silvered rear surface, are juxtaposed to reflect incident light rays while focusing them upon an image plane. Such objectives, which are particularly useful in copying machines, are known for example from German printed specification No. 1,797,147 and German published specification No. 2,157,058.

The object of my present invention is to provide an objective of this general type which does not require any mechanical vignetting and operates with a large depth of field in focusing a modulated scanning beam, as required in high-resolution copying apparatus, while using relatively inexpensive glasses for the lenses and convenient radii for their surfaces.

In an objective according to my present invention, the positive component is a biconvex lens whereas the negative component has the shape of a meniscus with silvered convex surface, such a lens being referred to in the art as a Margin mirror. The front surface of the biconvex lens, remote from the Mangin mirror, is preferably more strongly curved than its rear surface and has a refractive power approximately equaling that of the concave meniscus surface in absolute value.

The sole FIGURE of the accompanying drawing shows an objective according to my invention, comprising a positive front component in the form of a biconvex lens L and a negative rear component constituted by a Mangin mirror M. Lens L has front and rear radii $R_1$, $R_2$ and a thickness $d_1$; the air space separating it from mirror M has been designated $d_2$. The concave front face and the convex, silvered rear face of the mirror M have radii $R_3$, $R_4$; the mirror thickness has been indicated at $d_3$.

Off-axial rays originating at a point P, upon reflection by the silvered surface $R_4$, pass substantially with their original angle of divergence between the two components before being concentrated upon a point Q on the second traversal of lens L. In a copying machine, of course, the field in the immediate vicinity of axis O is not used.

The following Table lists the parameters of the illustrated components for an objective of relative aperture 1 : 5.0, with field angles ranging between about 8° and 20°, having a focal length of 100 linear units (e.g. millimeters) and an image distance of 183.82 units.

TABLE

|   |   |   | $n_e$ | $v_e$ | Surface Power $\Delta n/R$ |
|---|---|---|---|---|---|
| L | ($R_1 = + 42.95$ | $d_1 = 3.87$ | 1.5544 | 63.23 | + 0.01292 |
|   | ($R_2 = - 237.95$ | $d_2 = 9.25$ air space |   |   | + 0.00233 |
| M | ($R_3 = - 48.72$ | $d_3 = 2.35$ (silvered) | 1.6557 | 44.64 | − 0.01346 |
|   | ($R_4 = - 663.54$ |   |   |   | $\alpha$ 0.00499 |

From the foregoing Table it will be noted that the invididual surface powers $\Delta n/R_1$, $\Delta n/R_2$, $\Delta n/R_3$ (all refractive) and $\Delta n/R_4$ (reflective) are related substantially in the ratio of (+129):(+23):(−135):(+50). It can also be readily calculated that the individual focal length of lens L is +65.2 units whereas that of lens M (disregarding the mirror effect of surface $R_4$) is 80.3 units, based on an overall focal length of 100 units. Thus, the absolute power of lens M (without reflection) is less than that of lens L but greater than the overall power. The system is highly corrected for all aberrations within the above-indicated range of field angles.

I claim:

1. A reflecting-lens objective consisting of a biconvex lens and a negative-meniscus lens with a silvered convex surface air-spaced from said biconvex lens, the radii $R_1$ - $R_4$ and the thicknesses and separation $d_1$ - $d_3$ of said lenses, based upon an overall focal length of 100, their refractive indices $n_e$ and their Abbe numbers $v_e$ being substantially as given in the following Table:

|   |   | $n_e$ | $v_e$ |
|---|---|---|---|
| $R_1 = + 43$ | $d_1 = 3.9$ | 1.55 | 63 |
| $R_2 = - 238$ |   |   |   |
| $R_3 = - 49$ | $d_2 = 9.3$ air space |   |   |
| $R_4 = - 664$ | $d_3 = 2.4$ (silvered) | 1.66 | 45 |

* * * * *